(12) United States Patent
Hong et al.

(10) Patent No.: US 11,338,255 B2
(45) Date of Patent: May 24, 2022

(54) MICROBUBBLE GENERATING SYSTEM

(71) Applicants: LG ELECTRONICS INC., Seoul (KR); CHUNGANG UNIVERSITY INDUSTRY ACADEMIC COOPERATION FOUNDATION, Seoul (KR)

(72) Inventors: Hyungki Hong, Seoul (KR); Sangki Woo, Seoul (KR); Sangsoo Ahn, Seoul (KR); Jongmin Kim, Seoul (KR); Seunghoon Oh, Seoul (KR); Jeongil Lee, Seoul (KR); Minsub Hwang, Gyeonggi-do (KR)

(73) Assignees: LG Electronics Inc., Seoul (KR); Chungang University Industry Academic Cooperation Foundation, Seoul (KR)

( * ) Notice: Subject to any disclaimer, the term of this patent is extended or adjusted under 35 U.S.C. 154(b) by 400 days.

(21) Appl. No.: 16/469,901

(22) PCT Filed: Dec. 18, 2017

(86) PCT No.: PCT/KR2017/014970
§ 371 (c)(1),
(2) Date: Jun. 14, 2019

(87) PCT Pub. No.: WO2018/111055
PCT Pub. Date: Jun. 21, 2018

(65) Prior Publication Data
US 2020/0078745 A1 Mar. 12, 2020

(30) Foreign Application Priority Data
Dec. 16, 2016 (KR) .................. 10-2016-0172956

(51) Int. Cl.
*B01F 23/231* (2022.01)
*C25B 1/04* (2021.01)
*B01F 23/2373* (2022.01)

(52) U.S. Cl.
CPC .... *B01F 23/23105* (2022.01); *B01F 23/2373* (2022.01); *C02F 2303/26* (2013.01); *C25B 1/04* (2013.01); *Y02E 60/36* (2013.01)

(58) Field of Classification Search
CPC ............... C02F 2303/26; C02F 1/4674; C02F 2103/026; C02F 2307/12; C02F 1/34;
(Continued)

(56) References Cited

U.S. PATENT DOCUMENTS

2009/0051056 A1* 2/2009 Kikuchi .............. B01F 3/04248
261/78.1
2011/0147231 A1 6/2011 Gordon et al.
(Continued)

FOREIGN PATENT DOCUMENTS

JP 2011245405 A * 12/2011 ................ B01F 5/06
JP 2014095100 5/2014
(Continued)

OTHER PUBLICATIONS

Extended European Search Report in European Appln. No. 17881736.7, dated Jul. 23, 2020, 7 pages.

*Primary Examiner* — Ciel P Contreras
(74) *Attorney, Agent, or Firm* — Fish & Richardson P.C.

(57) ABSTRACT

A micro-bubble generating system according to an embodiment of the present invention may include an electrolytic bath configured to generate primary micro-bubbles; a water supply hose which is connected to an outlet end of the electrolytic bath; and a micro-bubble generating device which is connected to the outlet end of the water supply hose
(Continued)

to generate secondary micro-bubbles having a smaller diameter than the primary micro-bubbles.

7 Claims, 3 Drawing Sheets

(58) Field of Classification Search
CPC ...... B01F 2003/04858; B01F 23/23105; B01F 23/2372; B01F 23/20; C25B 1/04; C25B 9/17; C25B 1/26; Y02E 60/36; F15D 1/02; F16L 55/00
See application file for complete search history.

(56) References Cited

U.S. PATENT DOCUMENTS

| | | |
|---|---|---|
| 2012/0318751 A1 | 12/2012 | Kijima et al. |
| 2015/0122741 A1 | 5/2015 | Eckelberry et al. |

FOREIGN PATENT DOCUMENTS

| | | |
|---|---|---|
| JP | 2016036775 | 3/2016 |
| KR | 20130027011 | 3/2013 |
| KR | 101609772 | 4/2016 |
| KR | 20160041531 | 4/2016 |

\* cited by examiner

MICROBUBBLE GENERATING SYSTEM

CROSS-REFERENCE TO RELATED APPLICATIONS

This application is a National Stage application under 35 U.S.C. § 371 of International Application No. PCT/KR2017/014970, filed on Dec. 18, 2017, which claims the benefit of Korean Application No. 10-2016-0172956, filed on Dec. 16, 2016. The disclosures of the prior applications are incorporated by reference in their entirety.

TECHNICAL FIELD

The present invention relates to a micro-bubble generating device.

BACKGROUND ART

Micro-bubbles contain micro-bubbles of $10^{-6}$ m or less and rises above the surface of water more slowly than general bubbles which have a size of about $10^{-2}$ to $10^{-3}$ m and rise properly above the surface of water and are ruptured, and when ruptured, at a temperature of 4,000 to 6,000° C., 20,000 to 150,000 negative ions, and a high sound pressure of 140 db instantaneously occur.

The micro-bubbles are known to have various effects.

First, air bubbles with a diameter of 50 micrometers repeat a series of compressive and destructive reactions in a short period of time, and generate ultrasonic waves at a speed of 400 km per hour when ruptured, thereby resulting in the effects of skin massage and exfoliation.

Second, when micro-bubbles disappear due to the self-pressurizing effect, free radicals such as hydroxyl radicals (OH—) are generated, and free radicals decompose various harmful chemicals and germs present in water.

Third, micro-bubbles generate more than 10 times more negative ions than ordinary waterfall, and negative ions are known to be beneficial to people through preventing cell aging or antioxidant function.

DISCLOSURE

Technical Problem

The micro-bubble generating device in the related art has a disadvantage in that a separate device for gas injection is required because gas and a liquid have to be simultaneously injected in order to generate micro-bubbles. As a result, there is a disadvantage in that the size of the entire system becomes large due to a subsidiary device (for example, a high pressure generating pump) connected to the periphery of the micro-bubble generating system.

The present invention is proposed in order to overcome such disadvantages.

Technical Solution

In order to achieve the above objective, according to an embodiment of the present invention, there is provided a micro-bubble generating system may include an electrolytic bath configured to generate primary micro-bubbles; a water supply hose which is connected to an outlet end of the electrolytic bath; and a micro-bubble generating device which is connected to the outlet end of the water supply hose to generate secondary micro-bubbles having a smaller diameter than the primary micro-bubbles.

Advantageous Effect

According to the micro-bubble generating system according to the embodiment of the present invention configured as described above, there is no need for an auxiliary device such as a pump for injecting gas and liquid at high pressure, and it is possible to implement the system using general equipment, not special equipment which can supply gas and liquid at high pressure.

Therefore, since simplification and miniaturization of the system can be achieved, there is an advantage of reducing product cost and improving productivity.

In addition, since the system can be simplified and miniaturized, there is an advantage that it can be also installed in home appliances such as household water purifiers and refrigerators.

BEST MODE

BEST MODE

Hereinafter, the structure and function of the micro-bubble generating system according to the embodiment of the present invention will be described in detail with reference to the drawings.

Figure 1:
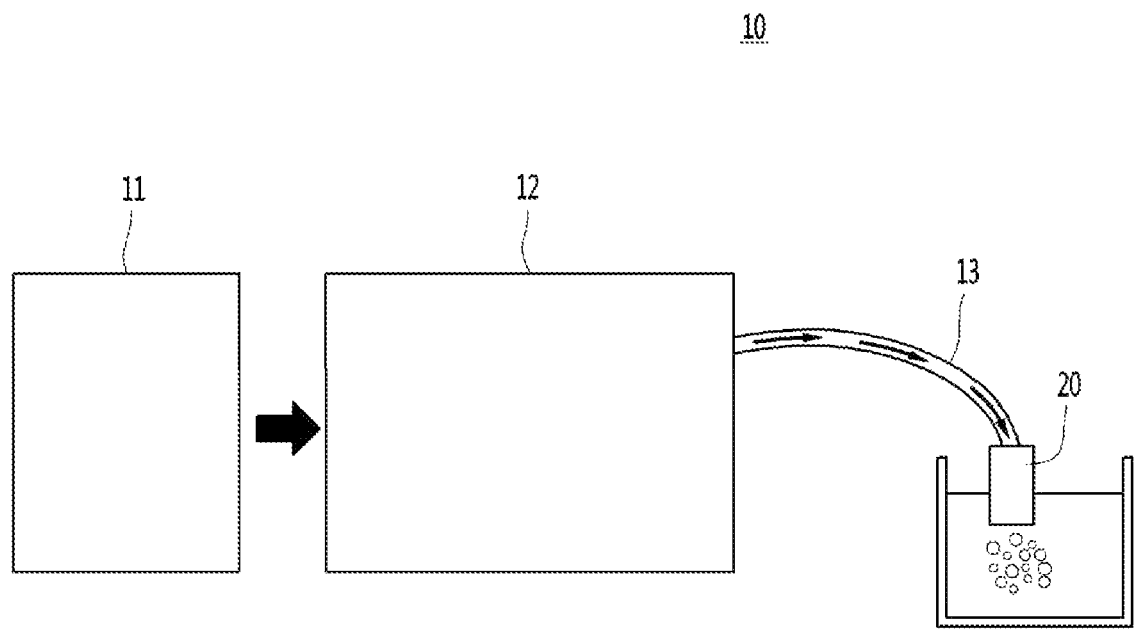
FIG. 1 is a system diagram schematically illustrating the configuration of a micro-bubble generating system according to an embodiment of the present invention.

FIG. 1 is a system diagram schematically illustrating the configuration of a micro-bubble generating system according to an embodiment of the present invention.

Referring to FIG. 1, a micro-bubble generating system 10 according to an embodiment of the present invention may include an electrolytic bath 12 having an electrolyte (for example, dilute hydrochloric acid (HCl) or sodium chloride) solution and generating primary bubbles through electrolysis, a water supply hose 13 connected to an outlet of the electrolytic bath 12, and a micro-bubble generating device 20 connected to an outlet end of the water supply hose 13 to generate minute bubbles.

In detail, the electrolytic bath 12 accommodates water from the water supply source 11, and the electrolyte is maintained in the ionized state in the electrolytic bath 12. When electricity is applied to the electrolytic bath 12, hydrogen gas and hypochlorous acid are generated through electrolysis of water.

Electrolysis reaction formulas and generated substances generated in the electrodes installed in the electrolytic bath 12 are as follows.

$2Cl^- \rightarrow Cl_2 + 2e^-$ (positive electrode): chlorine gas generation $2H_2O+2e^-\rightarrow H2\uparrow+2OH^-$ (negative electrode): Hydrogen gas and radical ion generation The chlorine gas is dissolved in water and reacts with radical ions (OH⁻) to generate hypochlorous acid water (HOCl).

$$Cl_2+2OH^-\rightarrow 2HOCl$$

The hypochlorous acid has the ability to quickly sterilize (99.9%) pathogenic bacteria and fungi such as bacteria and viruses and has a deodorizing effect.

After the electrolysis process, the hypochlorous acid water containing hydrogen gas is discharged through the water supply hose. In other words, primary micro-bubbles are generated through electrolysis in the electrolytic bath 12, and the solution containing the primary micro-bubbles flows into the micro-bubble generating device 20.

Meanwhile, in a case where the electrolyte supplied to the electrolytic bath is sodium chloride (NaCl), when electrolysis occurs, sodium hypochlorite (NaOCl) will be produced together with hydrogen gas.

Then, the micro-bubbles are pulverized while passing through the micro-bubble generating device 20, so that secondary micro-bubbles having a particle size significantly smaller than that of the primary micro-bubbles are generated and discharged. When the secondary micro-bubbles generated in the micro-bubble generating device 20 are discharged into the water, the water is blurred. Then, the user can visually confirm the generation of micro-bubbles with sterilizing cleaning function.

If the solution containing the primary micro-bubbles generated in the electrolytic bath is discharged into the water, the degree of diffused reflection of light is lower than that of the secondary micro-bubbles because the particles of the bubbles are relatively large. Therefore, compared to a case where the secondary micro-bubbles are discharged into the water, the degree of blur of the water (which can be defined as turbidity) falls, so that the degree of recognition by the user is relatively low.

In addition, since the diameter of the primary micro-bubbles is larger than the diameter of the secondary micro-bubbles, the sterilization and cleaning effect is also lower than that of the secondary micro-bubbles.

Hereinafter, the configuration and effects of the micro-bubble generating device 20 will be described with reference to the drawings.

Figure 2:
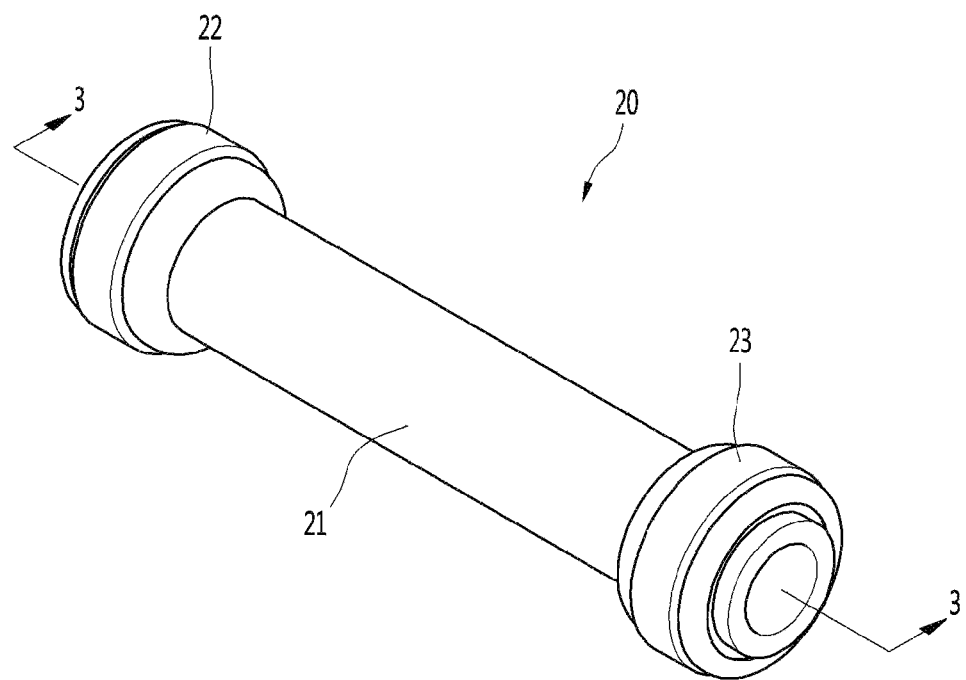
FIG. 2 is a perspective view illustrating a micro-bubble generating device according to an embodiment of the present invention.
Figure 3:
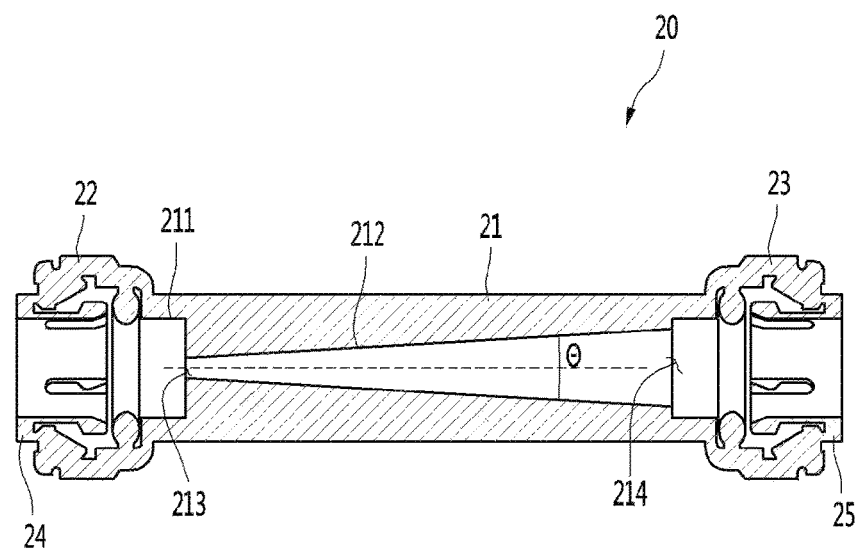
FIG. 3 is a sectional view illustrating the micro-bubble generating device taken along line 3-3 of FIG. 2.

FIG. 2 is a perspective view illustrating a micro-bubble generating device according to an embodiment of the present invention, and FIG. 3 is a sectional view illustrating the micro-bubble generating device taken along line 3-3 of FIG. 2.

Referring to FIGS. 2 and 3, the micro-bubble generating device 20 according to the embodiment of the present invention may include a body part 21, an inlet part 22 formed at one end of the body part 21, and an outlet part 23 formed at the other end of the body part 21.

In detail, the body part 21 may have a straight cylindrical shape. The outer diameters of the inlet part 22 and the outlet part 23 are formed to larger than the outer diameter of the body part 21 so that the connecting means such as the hose or hose connection parts 24 and 25 are connected to the inlet part 22 and the outlet part 23.

Meanwhile, the body part 21 may include an orifice part 211 and a venturi part 212 extending from the outlet end of the orifice part 211 therein.

In detail, an inflow port 213 of the venturi part 212 communicates with the orifice part 211 and the discharge port 214 of the venturi part 212 communicates with the outlet part 23. The orifice part 211 is formed at the outlet end with a hole having a diameter significantly smaller than the diameter of the pipe through which the fluid flows, thereby reducing the flow rate of the discharged fluid and reducing the discharge pressure. In other words, the inflow port 213 of the venturi part 212 may be regarded as a discharge port of the orifice part 211.

The orifice part 211 has a structure in which the diameter thereof does not decrease linearly or progressively from the inlet part to the inflow port 213 but decreases sharply. In other words, the sectional areas of the inlet surface and the outlet surface of the orifice part 211 are the same, the inflow port 213 is formed at the center of the outlet surface, and the outlet surface area of the orifice part 211 may be formed at least to be equal to or larger than the area of the discharge port 214.

In addition, the venturi part 212 functions to generate a cavitation effect which reduces the pressure of the fluid passing through the inflow part 213, causes the bubble having a relatively large diameter generated in the electrolytic bath 12 to rupture and split into bubbles having a very small diameter, and increases the number of bubbles.

From the inflow port 213 to the discharge port 214, a case where the diameter of the passage forms a truncated cone shape in which the diameter of the passage linearly increases is more effective in reducing the generation amount of micro-bubbles and the diameter of the bubbles, compared to a case where the passage diameter of the venturi part 212 forms a cylinder shape having a diameter equal to the diameter of the orifice part 211.

In other words, since the inner peripheral surface of the venturi part is sloped, the micro-bubbles passing through the inflow port 213 can be divided into smaller-sized bubbles through friction with the inner peripheral surface of the venturi part 212.

However, in a case where only a pure orifice structure is provided, that is, in a case where a partition wall having a very small diameter through-hole is installed in a cylindrical pipe path having a constant diameter, a state where the pressure of the fluid while passing through the through-hole is lowered is same as the state in a case where the venturi part 212 is provided at the outlet side of the through-hole.

However, when comparing the size and amount of the micro-bubbles included in the fluid discharged through the through-hole, it can be confirmed that the size of the bubbles is much smaller and the amount of the micro-bubbles is much higher in a structure in which the venture part 212 is formed compared to a structure in which the venture part 212 is not formed.

Particularly, cavitation phenomenon occurs most actively on the inner circumferential surface of the venturi part 212 adjacent to the inflow part 213, and the cavitation phenomenon decreases as the distance from the inflow part 213 increases.

The average diameter of the micro-bubbles contained in the fluid which has passed through the discharge port 214 of the venturi part 212 is 30-35 micrometers, and this is a value which is less than half the diameter of the primary micro-bubbles contained in the fluid passing through the electrolytic bath 12.

Further, it was confirmed through experiments that the object number of micro-bubbles discharged from the micro-bubble generating device 20 increased by about 500-600%, as compared with the object number of micro-bubbles contained in the fluid discharged from the electrolytic bath 12. Specifically, it was confirmed through experiments that the object number of micro-bubbles discharged from the electrolytic bath 12 is about $0.85 \times 10^6$, while the object number of micro-bubbles discharged from the micro-bubble generating device 20 is about $5.92 \times 10^6$.

In addition, the time during which the primary micro-bubbles passing through the electrolytic bath are maintained without being ruptured in the water, that is, the bubble life is about 1 minute 17 seconds, while the bubble life of the secondary micro-bubbles discharged from the micro-bubbles generating device 20 was about 1 minute 56 seconds, and it was confirmed that the bubble life increased by about 50%.

The ratio $D_{out}/D_{in}$ of the diameter Din of the inflow port 213 to the diameter $D_{out}$ of the discharge port 214 is preferably 2.4 to 6 in order to secure the size and the generating amount of the fine bubbles as described above. Specifically, the diameter $D_{in}$ of the inflow port 213 may be 0.5 to 3.5 mm, and the diameter $D_{out}$ of the discharge port 214 may be 1.4 to 21 mm.

In addition, the length of the venturi part 212 may be 10 mm to 50 mm, and the diffusion angle θ Of the venturi part 212 may be an angle within a range of $0°<\theta \leq 20°$.

The micro-bubble generating system 10 having the configurations described above can be installed in a home appliance such as a water purifier or a refrigerator. Specifically, the electrolytic bath 12 constituting the micro-bubble generating system 10 is installed inside a water purifier or a machine room of a refrigerator, and the micro-bubble generating device 20 can be installed in a dispenser part for discharging potable water from the water purifier and the refrigerator. Particularly, the micro-bubble generating device 20 is not exposed to the outside, and a water faucet is separately mounted on the hose connecting part 25 of the outlet end 13 so that only the water faucet part is exposed to the outside.

According to this configuration, when the user presses a cleaning water button through the operation panel, hypochlorous acid water containing the micro-bubbles can be discharged through the water faucet connected to the micro-bubble generating device 20.

When the hypochlorous acid water containing the micro-bubbles is discharged in the container containing water, the water contained in the container is changed into milky water which becomes cloudy. Then, the user can recognize that the sterilized water is discharged in the container, and it is easy to recognize that the amount of the sterilized water to be discharged is increased as the turbidity of the milky water increases.

Figure 4:
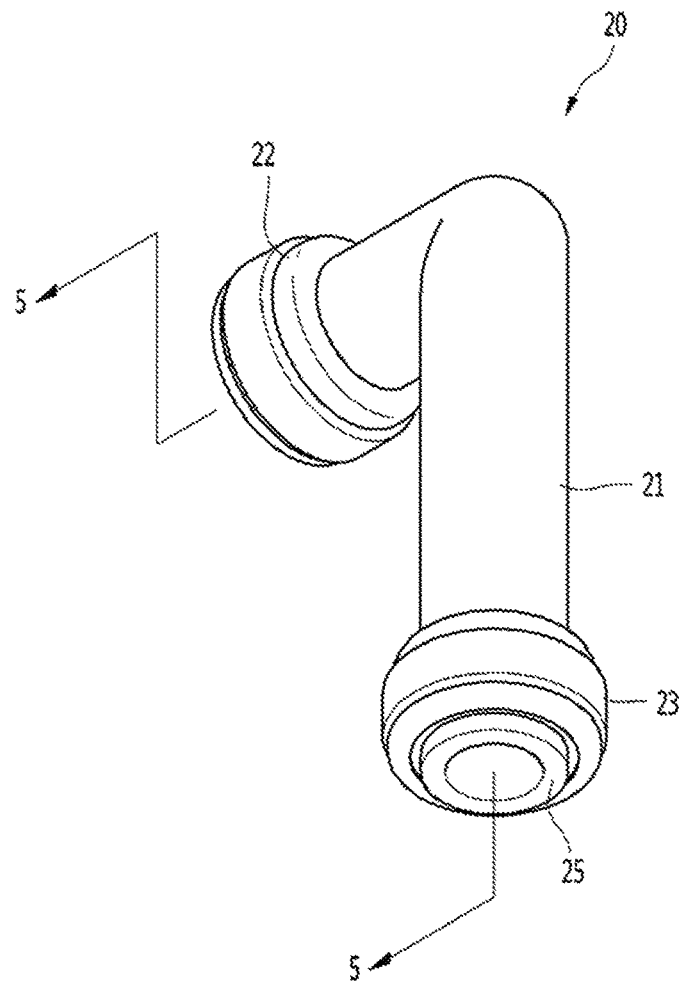
FIG. 4 is a perspective view illustrating a micro-bubble generating device according to a second embodiment of the present invention.
Figure 5:
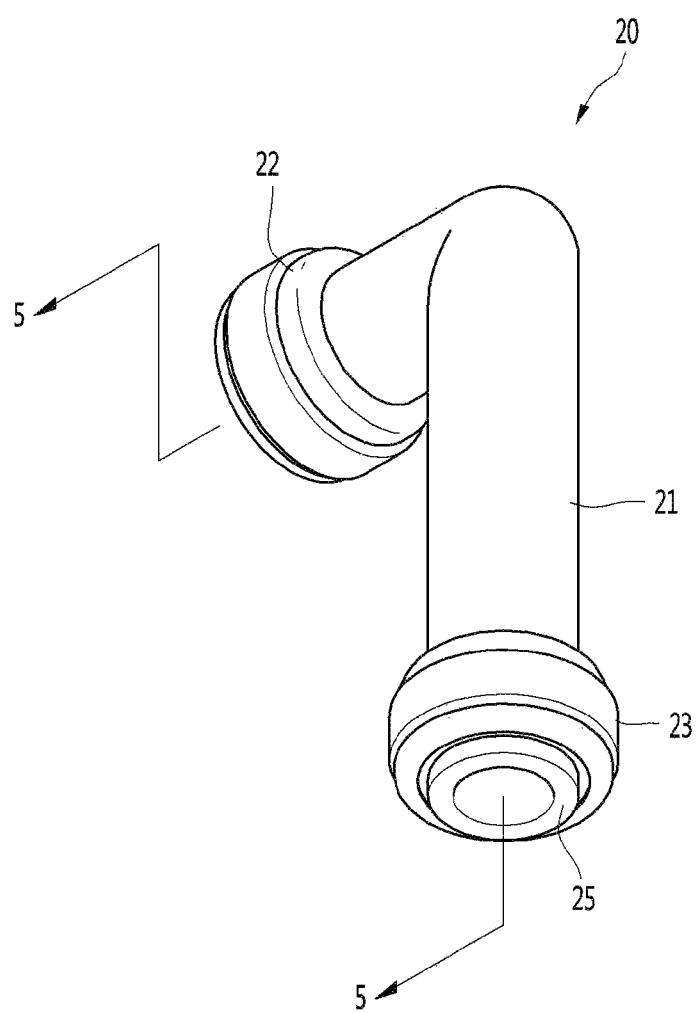
FIG. 5 is a sectional view illustrating a micro-bubble generating device according to a second embodiment taken along line 5-5 of FIG. 4.

FIG. 4 is a perspective view illustrating a micro-bubble generating device according to a second embodiment of the present invention, and FIG. 5 is a sectional view illustrating a micro-bubble generating device according to a second embodiment taken along line 5-5 of FIG. 4.

Referring to FIGS. 4 and 5, the micro-bubble generating device 20 according to the present embodiment is characterized in that the body part 21 is formed in a round manner at a certain point, the configurations other than the above are same the micro-bubble generating device 20 according to the first embodiment, and the same reference numerals are given to the same components.

In detail, the body part 21 of the micro-bubble generating device 20 may be formed to be bent at about 90 degrees from a point near the inlet part 22. Accordingly, the orifice part 211 may be formed inside the bent point of the body part 21. As a result, unlike the first embodiment in which the cross-section of the orifice part 211 has a rectangular shape, the cross-section of the orifice part 211 may have a fan shape.

Further, the venturi part 212 may be started at a point where the bending of the body part 21 ends and the straight line part starts. In other words, the outlet surface and the inflow part 213 of the venturi part 212 may be formed at a point where the bending of the body part 21 ends.

In the drawing, the orifice part 211 is illustrated as a shape which is stepped so that the sectional area of the flow passage is reduced at a point where the orifice part 211 is divided into a straight region (same as in the first embodiment) and a bent region of a fan shape, but it is not necessarily limited thereto. In other words, it is possible to maintain a cylindrical shape while maintaining a constant sectional area of the flow passage and to bend the sectional shape of the flow passage in a state of maintaining the sectional area thereof constant.

In addition, the radius of curvature of the bent part of the body part 21 may be 1 to 1.25 mm but is not limited thereto. The length of the venturi part 212 may be the same as that of the venturi part 212 of the first embodiment or may be shorter than that of the venturi part 212 of the first embodiment. Specifically, the length of the venturi part 212 may be 20 mm to 23 mm.

The invention claimed is:

1. A micro-bubble generating system comprising:
    an electrolytic bath configured to generate a primary bubble;
    a water supply hose connected to an outlet end of the electrolytic bath; and
    a micro-bubble generating device that is connected to an outlet end of the water supply hose and that is configured to generate a secondary bubble having a diameter less than the primary bubble,
    wherein the micro-bubble generating device further includes:
        a body part,
        an inlet part defined at a first end of the body part, and
        an outlet part defined at a second end of the body part,
        wherein the body part defines (i) an orifice part and (ii) a venturi part extending from an outlet surface of the orifice part,
        wherein the orifice part defines a cylindrical space and includes:
            an inlet surface that is in fluid communication with an inner space of the inlet part, and
            an outlet surface having a diameter that has a same size as a diameter of the inlet surface,
        wherein the venturi part provides an inflow port at a center of the outlet surface of the orifice part, the inflow port having a diameter less than the diameter of the outlet surface of the orifice part,
        wherein the venturi part has a truncated cone shape in which a sectional area of a flow passage linearly increases from the inflow port toward a discharge port, thereby to have a diameter of the discharge port greater than the diameter of the inflow port,
        wherein the venturi part defines an additional cylindrical space having a diameter greater than the diameter of the discharge port, and
        wherein the discharge port of the venturi part is defined at one end of the additional cylindrical space, and the other end of the additional cylindrical space is in fluid communication with an inner space of the outlet part.

2. The micro-bubble generating system of claim 1, wherein an area of the outlet surface of the orifice part is equal to or greater than at least an area of the discharge port.

3. The micro-bubble generating system of claim 1,
wherein a ratio (Dout/Din) of the diameter (Din) of the inflow port to the diameter (Dout) of the discharge port is 2.4 to 6.

4. The micro-bubble generating system of claim 1,
wherein the diameter (Din) of the inflow port is 0.5 to 3.5 mm, and
wherein the diameter (Dout) of the discharge port is 1.4 to 21 mm.

5. The micro-bubble generating system of claim 1,
wherein a diffusion angle (θ) of the venturi part satisfies 0°<θ≤20°.

6. The micro-bubble generating system of claim 1,
wherein the venturi part has a length of 10 mm to 50 mm.

7. The micro-bubble generating system of claim 1,
wherein the body part is bent at a certain point, and
wherein the certain point is closer to the inlet part than the outlet part.

* * * * *